United States Patent
Price

(10) Patent No.: US 10,623,065 B2
(45) Date of Patent: Apr. 14, 2020

(54) INDUCTIVE SWITCHING

(71) Applicant: Hewlett-Packard Development Company, L.P., Houston, TX (US)

(72) Inventor: Jonathan Price, Boise, ID (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/097,576

(22) PCT Filed: Jul. 27, 2016

(86) PCT No.: PCT/US2016/044343
§ 371 (c)(1),
(2) Date: Oct. 29, 2018

(87) PCT Pub. No.: WO2018/022048
PCT Pub. Date: Feb. 1, 2018

(65) Prior Publication Data
US 2019/0165835 A1    May 30, 2019

(51) Int. Cl.
*H04B 5/00* (2006.01)
*G06K 7/10* (2006.01)
*G06K 19/077* (2006.01)
*H04B 7/145* (2006.01)

(52) U.S. Cl.
CPC ....... *H04B 5/0062* (2013.01); *G06K 7/10336* (2013.01); *G06K 19/07777* (2013.01); *H04B 5/00* (2013.01); *H04B 5/0031* (2013.01); *H04B 5/0075* (2013.01); *H04B 5/0081* (2013.01); *H04B 7/145* (2013.01)

(58) Field of Classification Search
CPC .... H04B 5/0062; H04B 7/145; H04B 5/0081; G06K 19/07777; G06K 7/10336
See application file for complete search history.

(56) References Cited

U.S. PATENT DOCUMENTS

| | | | |
|---|---|---|---|
| 4,364,043 A | 12/1982 | Cole | |
| 6,104,291 A | 8/2000 | Beauvillier et al. | |
| 6,848,616 B2 | 2/2005 | Tsirline et al. | |
| 7,301,458 B2 | 11/2007 | Carrender et al. | |
| 7,400,255 B2 | 7/2008 | Horch | |
| 7,528,712 B2 | 5/2009 | Hong et al. | |
| 2008/0018433 A1* | 1/2008 | Pitt-Pladdy | G06K 7/0008 340/10.4 |
| 2010/0207729 A1 | 8/2010 | Ko et al. | |

(Continued)

OTHER PUBLICATIONS

Bolotnyy, L. et al., The Practicality of Multi-tag RFID Systems, Apr. 13, 2007, http://www.cs.virginia,edu/ ~ 10 pages.

*Primary Examiner* — Lewis G West
(74) *Attorney, Agent, or Firm* — HP Inc. Patent Department

(57) ABSTRACT

An example device includes a first inductive antenna to activate a radio frequency identification (RFID) device and to receive an identification signal from the activated RFID device, a second inductive antenna to emulate the RFID device by transmitting the identification signal of the RFID device, a switch positioned between the first inductive antenna and the second inductive antenna, and a controller to selectively open the switch to decouple the first inductive antenna and the second inductive antenna or close the switch to couple the first inductive antenna and the second inductive antenna.

17 Claims, 5 Drawing Sheets

(56) References Cited

U.S. PATENT DOCUMENTS

| | | | |
|---|---|---|---|
| 2012/0056722 A1* | 3/2012 | Kawaguchi | G06K 7/10009 340/10.1 |
| 2014/0124493 A1* | 5/2014 | Enyedy | G06K 19/07309 219/137 PS |
| 2017/0235980 A1* | 8/2017 | Wang | G06K 7/00 235/451 |
| 2017/0364905 A1* | 12/2017 | Hart | G06Q 20/3278 |

* cited by examiner

INDUCTIVE SWITCHING

BACKGROUND

Radio frequency identification (RFID) systems have been used in numerous environments. Such systems generally include an RFID device which transmits a signal to an RFID reader when the device and the reader come in close proximity to one another.

BRIEF DESCRIPTION OF THE DRAWINGS

For a more complete understanding of various examples, reference is now made to the following description taken in connection with the accompanying drawings in which.

DETAILED DESCRIPTION

Various examples provide for selective coupling or decoupling of components using inductive switching. In one example, a device provides coupling or decoupling for an RFID device to an RFID reader that may not be in close proximity. In this regard, an example device includes a first inductive antenna to couple with the RFID device (in one location, for example) and a second inductive antenna to couple with the RFID reader, which may be in a different location. The example device may be provided with a switch which allows the first and second inductive antennas to be coupled when the switch is closed and decoupled when the switch is open. A controller may selectively open or close the switch to couple and decouple the first and second inductive antennas.

RFID systems generally include an RFID device which transmits a signal to an RFID reader when the device and the reader come in close proximity to one another. In operation, an RFID reader is generally a powered device that may continuously or regularly transmit a signal. When an associated RFID device or an RFID tag comes in close proximity to the RFID reader, the signal from the RFID reader may activate the RFID tag or the RFID device. Accordingly, the signal transmitted by the RFID reader is referred to herein as an activation signal.

As noted above, the activation signal from the RFID reader may activate an RFID tag in the RFID device. In response to the activation signal, the RFID device may transmit an identification signal which, in various examples, may be unique to each RFID device. As described herein the signal transmitted by the RFID device in response to the activation signal is referred to as an identification signal. The RFID reader may detect the identification signal and perform a predetermined action such as, for example, unlocking a door.

Figure 1:
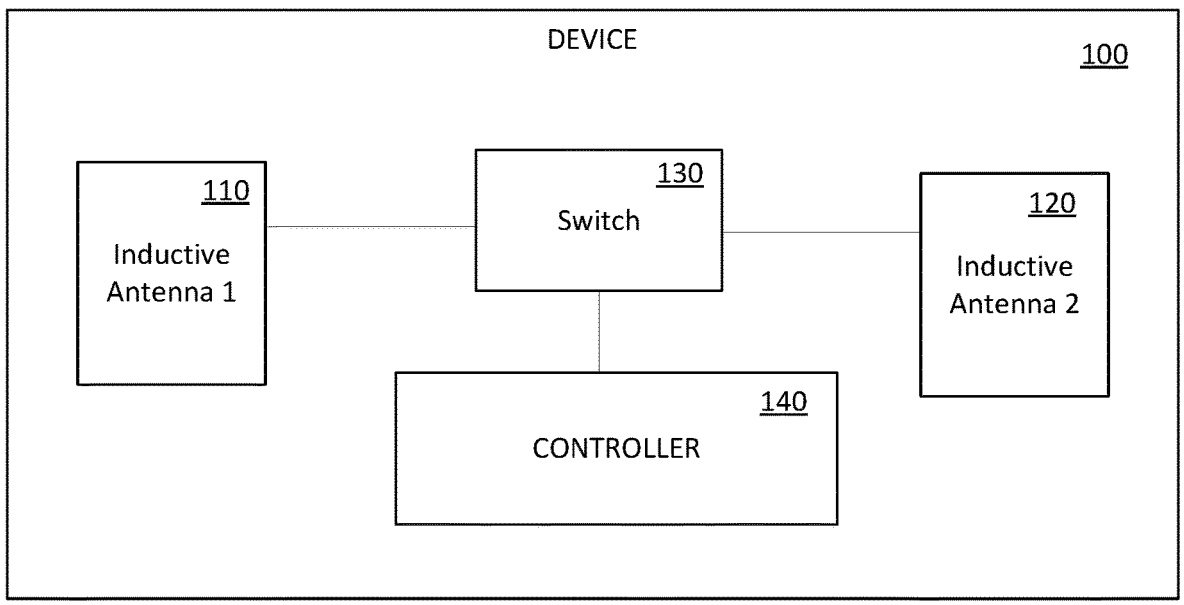
FIG. 1 is a schematic illustration of an example device for inductive switching.

Referring now to the figures, FIG. 1 provides a schematic illustration of an example device for inductive switching. The example device 100 includes a first inductive antenna 110 and a second inductive antenna 110. Each inductive antenna 110, 120 may be an inductive coil for magnetic coupling with other inductive coils or antenna. The size of each inductive antenna 110, 120 may be selected as desired for various uses. In this regard, size may refer to a physical size or an inductance magnitude of the inductive antenna.

The example device 100 of FIG. 1 further includes a switch 130 positioned between the first inductive antenna 110 and the second inductive antenna 120. The switch may be selectively opened or closed to allow electronic communication between the first inductive antenna 110 and the second inductive antenna 120.

The switch 130 may be responsive to a controller 140 provided in the example device 100. The controller 140 may be implemented as a processor that can receive commands from a user, for example. In other examples, the controller 140 may be provided with stored instructions. In various example devices, the controller 140 may be implemented as hardware, software or firmware, for example.

In the example device 100 of FIG. 1, the first inductive antenna 110 may be provided to couple with an RFID device (not shown in FIG. 1). For example, the first inductive antenna 110 may magnetically couple with an inductive antenna of an RFID tag in an RFID device. In this regard, the first inductive antenna 110 may transmit an activation signal similar to an RFID reader to activate the RFID device. In response to the activation signal, the first inductive antenna 110 may receive an identification signal from the activated RFID device.

Similarly, the second inductive antenna 120 may be provided to couple with an RFID reader (not shown in FIG. 1). For example, the second inductive antenna 120 may magnetically couple with an inductive antenna of an RFID reader. In various examples, the second inductive antenna 120 may transmit the identification signal received by the first inductive antenna 110 from the RFID device. In this regard, the second inductive antenna 120 may emulate the RFID device in communicating with the RFID reader.

In various examples, the first inductive antenna 110 and the second inductive antenna 120 may be located remotely from each other. For example, the two antennae may be located in different rooms, different buildings or even different cities.

Figure 2:
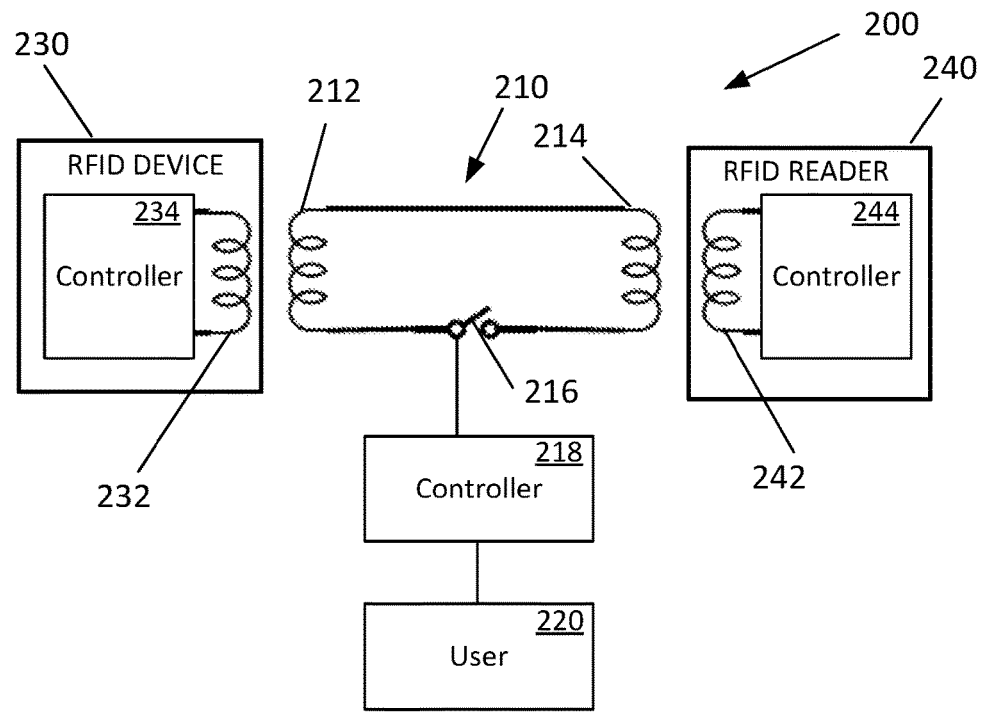
FIG. 2 illustrates an example RFID system using another example device for inductive switching.

Referring now to FIG. 2, an example RFID system using another example device for inductive switching is illustrated. The example RFID system 200 includes a switching device 210 that may be similar to the example device 100 described above with reference to FIG. 1. In this regard, the switching device 210 includes a first inductive antenna 212, a second inductive antenna 214, a switch 216 and a controller 218. As described above, the switch 216 may be selectively closed to electronically couple or opened to electronically decouple the first inductive antenna 212 and the second inductive antenna 214.

The example RFID system 200 of FIG. 2 further includes an RFID device 230. In various examples, the RFID device 230 may be an RFID tag or may contain an RFID tag therein. In this regard, the example RFID device 230 includes an inductive antenna 232 which may be an inductive coil for magnetically coupling with the first inductive antenna 212 of the example switching device 210. The RFID device 230 further includes a controller 234 which may be electronically coupled to the inductive antenna 232 of the RFID device 230.

In one example, the RFID device 230 is an unpowered device that may be responsive to an activation signal from the first inductive antenna 212 of the example switching device 210. In this regard, when the RFID device 230 is in close proximity to the first inductive antenna 212 of the example switching device 210, an activation signal from the first inductive antenna 212 may be received by the RFID device 230 through the magnetic coupling of the first inductive antenna 212 and the inductive antenna 232 of the RFID device 230. The activation signal may then be received by the controller 234, which may then transmit an identification signal through the inductive antenna 232 for receipt by the first inductive antenna 212 of the switching device 210.

The example RFID system 200 of FIG. 2 further includes an RFID reader 240. The example RFID reader 240 includes an inductive antenna 242 which may be an inductive coil for magnetically coupling with the second inductive antenna 214 of the example switching device 210. The RFID reader 240 further includes a controller 244 which may be electronically coupled to the inductive antenna 242 of the RFID reader 240.

In one example, the RFID reader 240 is a powered device that may be continuously or regularly transmitting an activation signal through the inductive antenna 242. Additionally, the RFID reader 240 may take some action based on an identification signal received in response to the activation signal. For example, when the RFID reader 240 is in close proximity to the second inductive antenna 214 of the example switching device 210, an identification signal from the second inductive antenna 214 may be received by the RFID reader 240 through the magnetic coupling of the second inductive antenna 214 and the inductive antenna 242 of the RFID reader 240. The identification signal may then be received by the controller 244 of the RFID reader, which may take an action, such as opening a door, for example.

In various examples, the controller 218 may be accessible by a user 220 to receive commands to, for example, control the switch 216. In this regard, the user 220 may, as desired, allow coupling of the first inductive antenna 212 and the second inductive antenna 214 by commanding the controller 218 to selectively close the switch 216.

As noted above, in the example switching device 210, the first inductive antenna 212 and the second inductive antenna 214 may be located remotely from each other. For example, the two antennae may be located in different rooms, different buildings or even different cities.

In various examples, the example system 200 of FIG. 2 may be used to allow a user to selectively couple or decouple the RFID device 230 and the RFID reader 240 even if they are not in close proximity. For example, when desired, a user may command the controller to close the switch, thereby coupling the first inductive antenna 212 and the second inductive antenna 214 of the example switching device 210. The example switching device 210 may then receive the activation signal being continuously or regularly transmitted by the RFID reader 240 through the second inductive antenna 214 of the example switching device 210.

The activation signal may be electrically transmitted to the controller 218 of the switching device 210. Based on stored instructions or instructions from a user 220, the controller 218 of the example switching device 210 may re-transmit the activation signal through the first inductive antenna 212, which may then activate the RFID device 230. From the perspective of the RFID device 230, the activation signal may be identical to an activation signal transmitted directly by the RFID reader 240. In this regard, the switching device 210 may be considered to be emulating the RFID reader 240. In other examples, the activation signal may be electrically transmitted from the second inductive antenna 214 to the first inductive antenna, without going through the controller 218.

In response to the activation signal, the RFID device 230 may transmit an identification signal which uniquely identifies the RFID device 230. The identification signal may be received by the example switching device 210 through the first inductive antenna 212. The identification signal may be electrically transmitted to the controller 218 of the example switching device 210. Based on stored instructions or instructions from a user 220, the controller 218 of the example switching device 210 may re-transmit the identification signal through the second inductive antenna 214. The identification signal may be received by the RFID reader 240, causing the RFID reader 240 to take a predetermined action. From the perspective of the RFID reader 240, the identification signal may be identical to an identification signal transmitted directly by the RFID device 230. In this regard, the switching device 210 may be considered to be emulating the RFID device 230.

Figure 3:
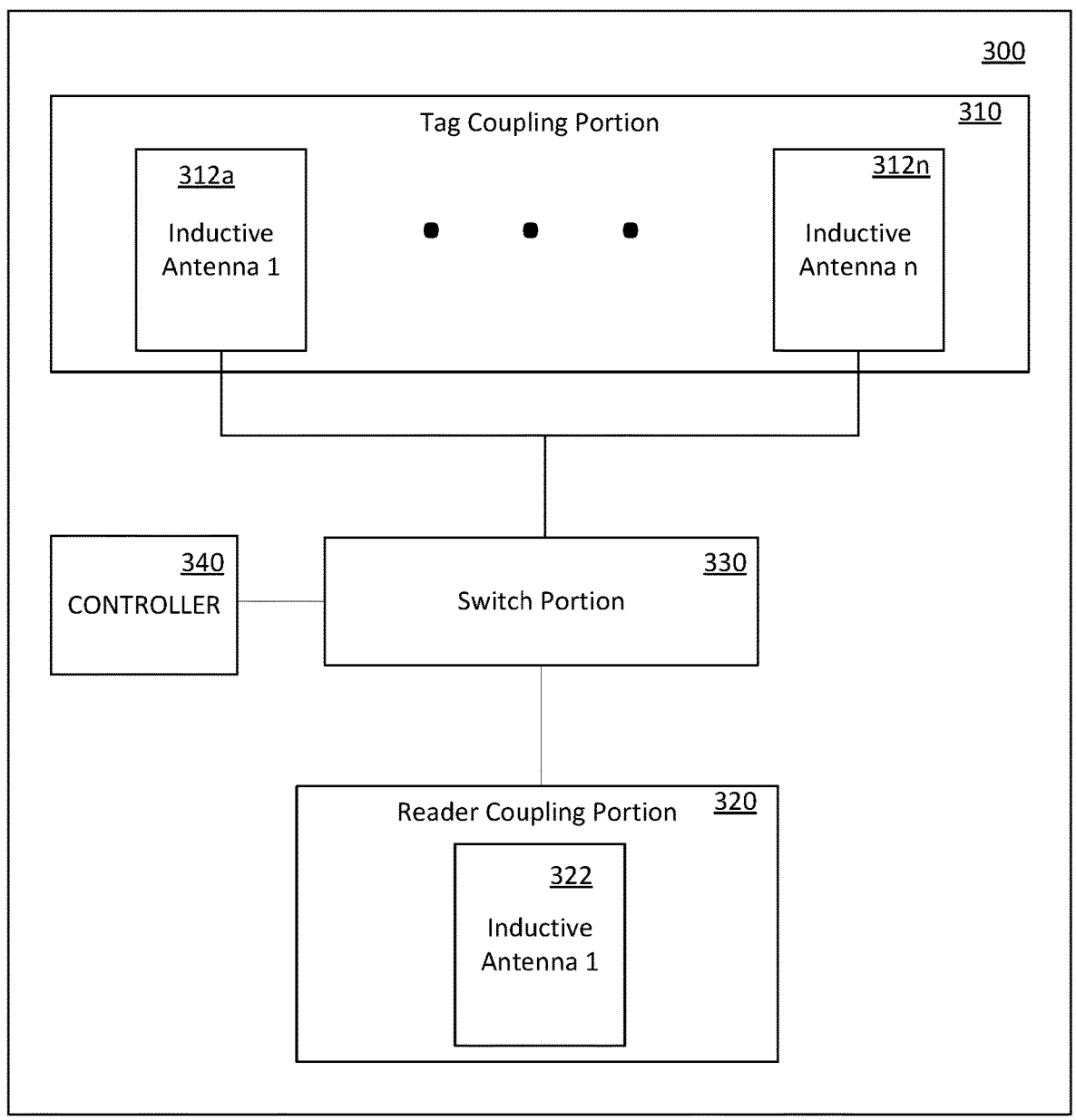
FIG. 3 is a schematic illustration of an example apparatus for inductive switching.

Referring now to FIG. 3, an example apparatus for inductive switching is schematically illustrated. The example apparatus 300 of FIG. 3 is provided with a tag coupling portion 310, a reader coupling portion 320, a switch portion 330 and a controller 340. The tag coupling portion 310 includes an array of at least two inductive antennas 312a-n. In various examples, the tag coupling portion 310 may include any desired number of inductive antennas 312a-n. The reader coupling portion 320 of the example apparatus 300 is also provided with an inductive antenna 322.

The switch portion 330 of the example apparatus 300 of FIG. 3 may include at least one switch or an array of switches. In this regard, the switch portion 330 allows selective coupling or decoupling of the antenna 322 of the reader coupling portion 320 to each of the inductive antennas 312a-n of the tag coupling portion 310.

The switch portion 330 of the example apparatus 300 of FIG. 3 may be operated by the controller 340. In this regard, the controller 340 may selectively couple the inductive antenna 322 of the reader coupling portion 320 to one inductive antenna 312a-312n of the tag coupling portion 310, while decoupling the inductive antenna 322 of the reader coupling portion 320 from all other antennas 312a-n of the at antennas of the tag coupling portion 310. Thus, in various examples, the switch portion 330 may allow for coupling of the reader coupling portion 320 to one antenna at a time from the antennas 312a-n of the tag coupling portion 310.

Figure 4:
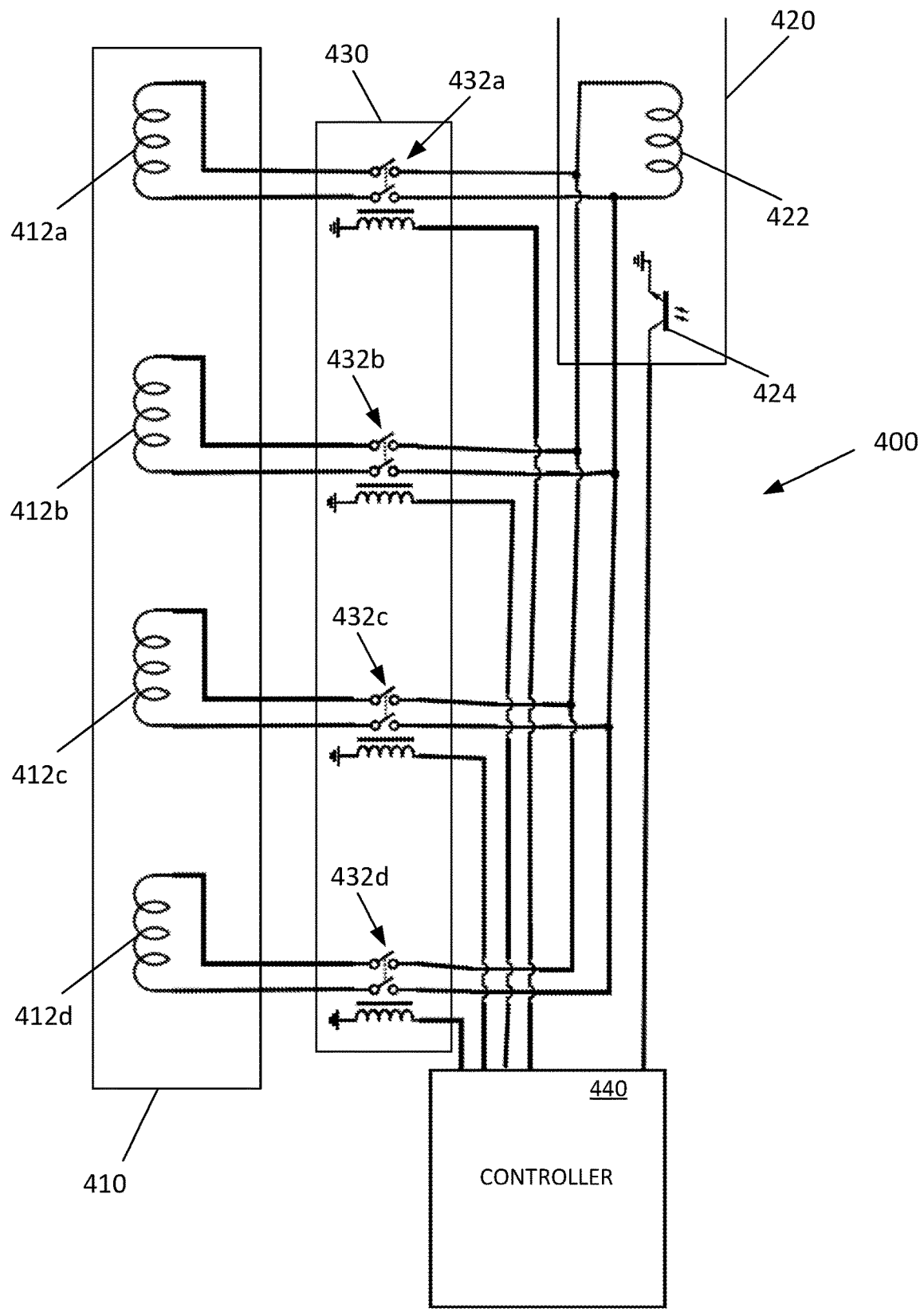
FIG. 4 illustrates another example apparatus for inductive switching.

Referring now to FIG. 4, another example apparatus for inductive switching is illustrated. The example apparatus 400 of FIG. 4 includes a tag coupling portion 410, a reader coupling portion 420, a switch portion 430 and a controller 440. The tag coupling portion 410 includes an array of inductive antennas 412a-d. In the illustrated example of FIG. 4, the tag coupling portion 410 is shown with four inductive antennas 412a-d, but any number of inductive antennas may be provided and are contemplated within the scope of the present disclosure.

The reader coupling portion 420 of the example apparatus 400 is also provided with an inductive antenna 422. In the example of FIG. 4, the reader coupling portion 420 is further provided with a sensor 424. In various examples, the sensor 424 may be an audio sensor or a visual sensor. In this regard, the sensor 424 may be a microphone provided to detect an audio signal or a light sensor to detect a light or a flash, for example.

The switch portion 430 of the example apparatus 400 of FIG. 4 includes an array of switches 432a-d. In the example of FIG. 4, the number of switches 432a-d matches the number of inductive antennas 412a-d in the tag coupling portion 410. The switch portion 430 allows selective coupling or decoupling of the antenna 422 of the reader coupling portion 420 to each of the inductive antennas 412a-d of the tag coupling portion 410. For example, each switch 432a-d in the switch portion 430 allows for selective coupling of a corresponding inductive antenna 412a-d of the tag coupling portion 410 with the inductive antenna 422 of the reader coupling portion 420.

In the example illustrated in FIG. 4, each switch 432a-d is a double-pole switch. In this regard, two portions of the double-pole switch act in accord to either close or open both lines in a circuit connecting the corresponding inductive antenna 412a-d of the tag coupling portion 410 to the inductive antenna 422 of the reader coupling portion 420.

The switch portion 430 of the example apparatus 400 of FIG. 4 may be operated by the controller 440. In this regard, the controller 440 may selectively couple the inductive antenna 422 of the reader coupling portion 420 to one inductive antenna 412a-d of the tag coupling portion 410, while decoupling the inductive antenna 422 of the reader coupling portion 420 from all other antennas 412a-d of the at antennas of the tag coupling portion 410.

Figure 5:
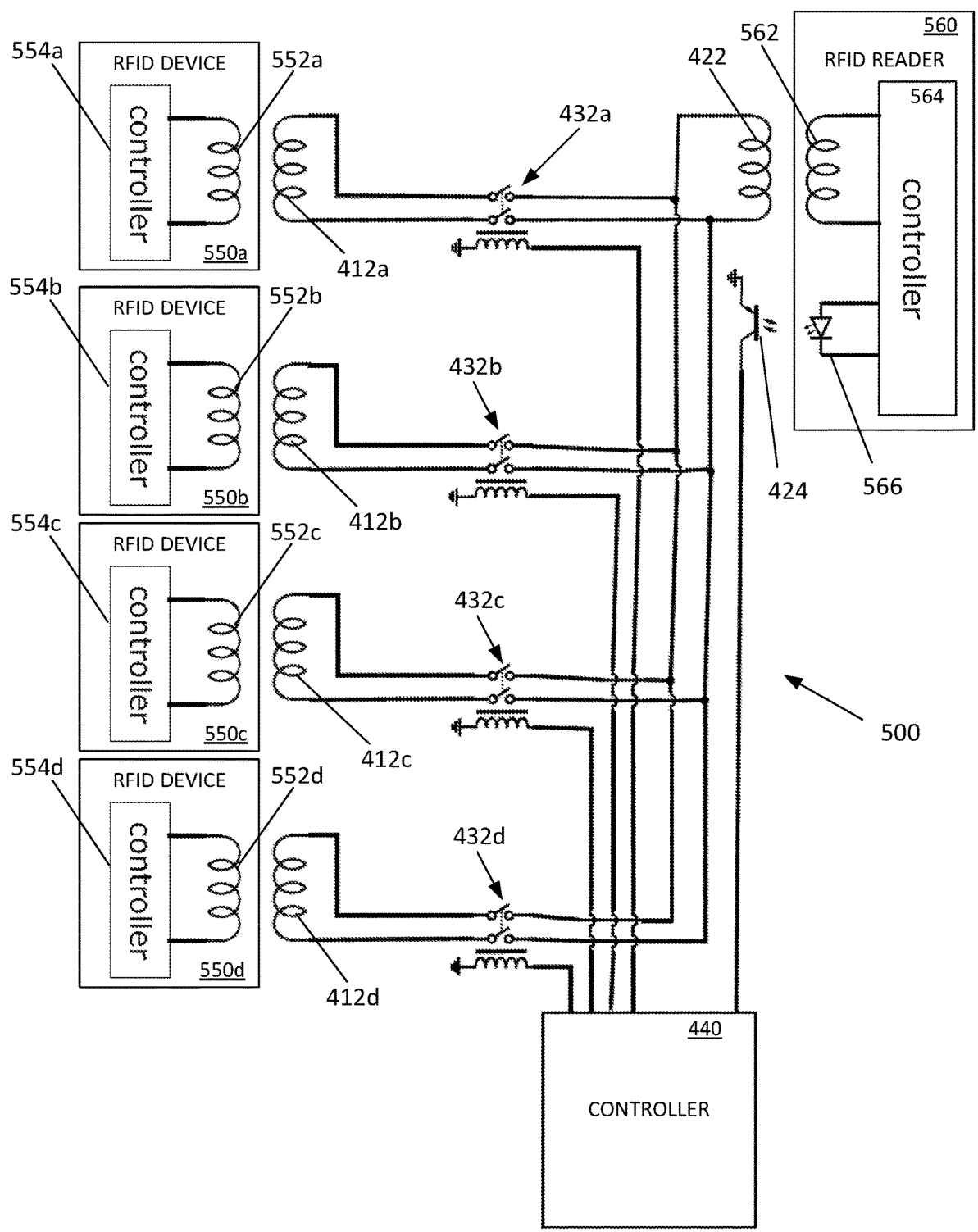
FIG. 5 illustrates an RFID system using the example apparatus of FIG. 4.

Referring now to FIGS. 4 and 5, an example RFID system 500 using the example apparatus 400 of FIG. 4 is illustrated in FIG. 5. In the example system 500 of FIG. 5, the example apparatus 400 of FIG. 4 is coupled to various RFID devices 550a-d and an RFID reader 560. In particular, each RFID device 550a-d is coupled to one of the inductive antennas 412a-d of the tag coupling portion 410, and the RFID reader 560 is coupled to the inductive antenna 422 of the reader coupling portion 420.

Each RFID device 550a-d is similar to the RFID device 230 described above with reference to FIG. 2. In this regard, each RFID device 550a-d of FIG. 5 includes an inductive antenna 552a-d and a controller 554a-d. Similarly, the RFID reader 560 is similar to the RFID reader 240 described above with reference to FIG. 2. In the example system 500 of FIG. 5, the example RFID reader 560 further includes an indicator 566. In various examples, the indicator 566 may be an audio indicator and/or a visual indicator. For example, the indicator 566 may be a speaker which generates an audio alert that may be detected by the sensor 424, which may be a microphone. In other examples, the indicator 566 may be a light-emitting diode (LED) which may be detected by the sensor 424, which may be a light sensor.

In various examples, the system 500 of FIG. 5 may be used to test functionality of the RFID reader 560 with a number of corresponding RFID devices, such as the RFID devices 550a-d of FIG. 5. In one example, a number of RFID devices 550a-d may be moved into position so they may be coupled to the inductive antennas 412a-d of the tag coupling portion 410. The controller may then sequentially close the switches 432a-d one at a time to allow coupling of each of the RFID devise 550a-d with the RFID reader 560.

One example method of testing or activating numerous RFID devices with the system of FIG. 500 will now be described. An RFID reader 560 corresponding to the RFID devices to be tested may be positioned proximate to the inductive antenna 422 of the reader coupling portion of the device 400. The RFID reader 560 may be powered and, accordingly, may generate an activation signal, which may be detected by the inductive antenna 422 of the device 400.

A number of RFID devices, such as RFID devices 550a-d may then be moved into position such that each of the RFID devices 550a-d is proximate to one of the inductive antennas 412a-d of the tag coupling portion 410 of the device 400. Of course, the number of RFID device 550a-d may be any number up to the number of inductive antennas 412a-d in the tag coupling portion 410.

The controller 440 may then sequentially test each of the RFID devices 550 for proper coupling with the RFID reader 560. In this regard, the controller may first close a first switch 432a in the switching portion 430, thereby allowing coupling of the inductive antenna 422 of the reader coupling portion 420 with a first inductive antenna 412a of the tag coupling portion 410. The remaining switches 432b-d may be opened to decouple the inductive antenna 422 of the reader coupling portion 420 from the other inductive antennas 412b-d of the tag coupling portion 410.

As noted above, the activation signal from the RFID reader 560 may be detected by the inductive antenna 422 of the reader coupling portion 420. With the inductive antenna 422 of the reader coupling portion 420 coupled to the first inductive antenna 412a of the tag coupling portion 410, the activation signal may be re-transmitted through the first inductive antenna 412a of the tag coupling portion 410.

The activation signal may then be received by the RFID device 550a that is positioned proximate to the first inductive antenna 412a of the tag coupling portion 410. If the RFID device 550a is operating properly, it may generate an identification signal that is responsive to the activation signal. The identification signal may be received by the first inductive antenna 412a of the tag coupling portion 410 and electrically transmitted to the inductive antenna 422 of the reader coupling portion 420. The identification signal may then be transmitted through the inductive antenna 422 of the reader coupling portion 420.

The RFID reader 560 may then receive the identification signal through the inductive antenna 562. If the controller 564 of the RFID reader 560 recognizes the identification signal as an appropriate identification signal, the controller 564 may activate the indicator 566. For example, the controller 564 may cause an LED to light up or a speaker to generate a sound. The activation of the indicator 566 may be detected by the sensor 424 of the device 400 and transmitted to the controller 440. The controller 440 may thus determine whether or not the RFID device 550a has passed testing or has been successfully activated by determining whether the RFID device 550 has successfully transmitted identification information that is recognized by the RFID reader 560.

The process may then be repeated for each of the other RFID devices 550b-d. For example, the controller 440 may then open the first switch 432a, close the second switch 432b and keep the other switches 432c-d opened. Thus, the inductive antenna 422 of the reader coupling portion 420 may be coupled with the second inductive antenna 412b of the tag coupling portion 410, while the inductive antenna 422 of the reader coupling portion 420 is decoupled from the other inductive antennas 412a, 412c, 412d of the tag coupling portion 410. The second RFID device 550b may be tested in a manner similar to that described above. The process may be repeated for each of the remaining RFID devices.

Figure 6:
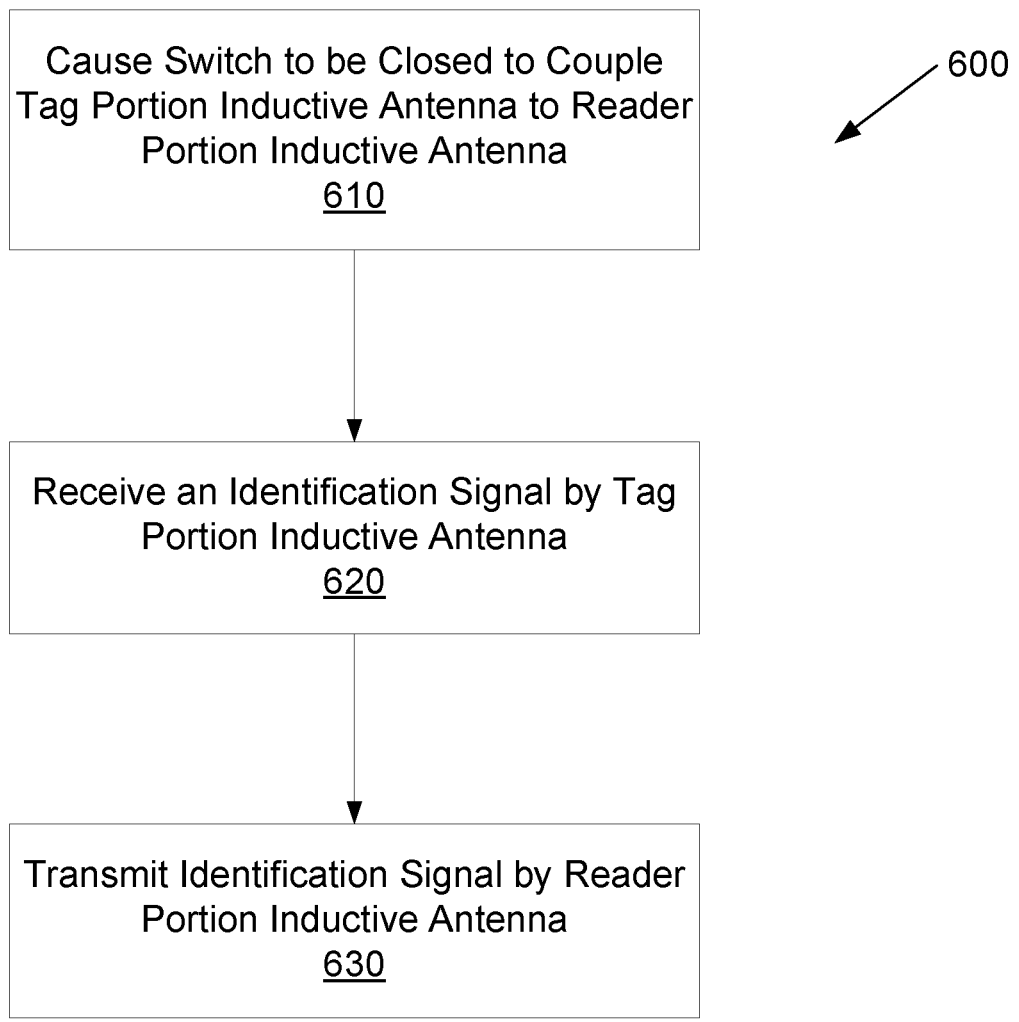
FIG. 6 is a flow chart illustrating an example process for inductive switching.

Referring now to FIG. 6, an example process for inductive switching is illustrated. The example process 600 may be implemented in any of a variety of devices, such as the example 100 of FIG. 1. In the example process 600, a switch may be closed to selectively couple a reader portion inductive antenna to a tag portion inductive antenna (block 610).

In one example, as described above with reference to FIG. 2, the controller 218 may cause the switch 216 to be closed to couple the first inductive antenna 212 to the second inductive antenna. In another example, as described above with reference to FIGS. 4 and 5, the controller 440 may cause the first switch 432a to be selectively closed to couple the first inductive antenna 412a of the tag coupling portion 410 to the inductive antenna 422 of the reader coupling portion 420.

Referring again to FIG. 6, in the example process 600, an identification signal is received by the tag portion inductive antenna (block 620). For example, as described above with reference to FIG. 2, in response to an activation signal, the RFID device 230 may transmit an identification signal which may be received by the first inductive antenna 212 of the switching device 200. As a further example, as described above with reference to FIG. 5, with the first switch 432a closed, an activation signal may be re-transmitted through the first inductive antenna 412a of the tag coupling portion 410. In response, the first RFID device 550a may generate an identification signal which may be received by the first inductive antenna 412a of the tag coupling portion 410.

The example process 600 of FIG. 6 further includes transmitting the identification signal by the reader portion inductive antenna (block 630). For example, as described above with reference to FIG. 2, the identification signal from the RFID device 230 is electrically transmitted to the second inductive antenna 214 of the switching device 210. The identification signal may then be transmitted by the second inductive antenna 214 of the switching device 210 for receipt by, for example, the RFID reader 240. As another example, as described above with reference to FIG. 5, the identification signal received by the first inductive antenna 412a of the tag coupling portion 410 is electrically received by the inductive antenna 422 of the reader coupling portion 420. The identification signal may then be transmitted by the inductive antenna 422 of the reader coupling portion 420 for receipt by, for example, the RFID reader 560.

Thus, in accordance with various examples described herein, inductive switching may be provided to allow an RFID device to communicate with an RFID reader that may not be in close proximity to the RFID device. Further, various examples described herein may be used for a variety of applications, including efficient testing of RFID devices and readers, for example.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A device, comprising:
   a first inductive antenna to activate a radio frequency identification (RFID) device and to receive an identification signal from the activated RFID device;
   a second inductive antenna to emulate the RFID device by transmitting the identification signal of the RFID device;
   a switch positioned between the first inductive antenna and the second inductive antenna; and
   a controller to selectively open the switch to decouple the first inductive antenna and the second inductive antenna or close the switch to couple the first inductive antenna and the second inductive antenna, wherein the switch and contoller are to connect the first inductive antenna to the second inductive antenna to communicate the identification signal received from the RFID device at the first inductive antenna to the second inductive antenna, and wherein the second inductive antenna is to emulate the RFID device by transmitting the identification signal received from the first inductive antenna via the switch.

2. The device of claim 1, wherein the controller closes the switch in response to either receiving of an activation signal by the second inductive antenna or receiving an instruction from a user.

3. The device of claim 1, wherein the controller causes the first, inductive antenna to transmit an activation signal received by the second inductive antenna.

4. The device of claim 1, wherein first inductive antenna and the second inductive antenna are located remotely from each other.

5. The apparatus of claim 1, wherein the controller includes a hardware processor.

6. An apparatus, comprising:
   a tag coupling portion including an array of at least two inductive antennas;
   a reader coupling portion including an inductive antenna;
   a switch portion to selectively couple or decouple the inductive antenna of the reader coupling portion to each of the at least two inductive antennas of the tag coupling portion; and
   a controller to operate the switch portion to selectively couple the inductive antenna of the reader coupling portion to one antenna of the at least two inductive antennas of the tag coupling portion while decoupling the inductive antenna of the reader coupling portion from all other antennas of the at least two inductive antennas of the tag coupling portion, wherein the switch and controller are further to couple the inductive antenna of the reader coupling portion to at least one of the at least two inductive antennas to communicate an identification signal received from the reader coupling portion, and wherein at least one of the at least two inductive antennas is to transmit the identification signal received from the inductive antenna of the reader couplinu portion.

7. The apparatus of claim 6, wherein the controller causes the one antenna of the at least two inductive antennas of the tag coupling portion coupled to the inductive antenna of the reader coupling portion to transmit an activation signal.

8. The apparatus of claim 7, wherein the one antenna of the at least two inductive antennas of the tag coupling portion coupled to the inductive antenna of the reader coupling portion receives an identification signal in response to the activation signal.

9. The apparatus of claim 8, wherein the controller causes the inductive antenna of the reader coupling portion to transmit the identification signal by causing the switch portion to couple the inductive antenna of the reader coupling portion to the one antenna of the at least two inductive antennas of the tag coupling portion that receives the identification signal.

10. The apparatus of claim 9, further comprising:
a sensor to detect an indicator in response to transmitting of the identification signal by the inductive antenna of the reader coupling portion.

11. The apparatus of claim 10, wherein the sensor is one of a visual sensor or an audio sensor.

12. The apparatus of claim 6, wherein the switch portion includes array of at least two switches, wherein each switch of the at least two switches selectively closes or opens to couple or decouple, respectively, the inductive antenna of the reader coupling portion to a corresponding one of the at least two inductive antennas of the tag coupling portion.

13. A method, comprising:
causing a switch to be closed, the switch being to selectively couple a reader portion inductive antenna to a tag portion inductive antenna, wherein causing the switch to be closed includes connecting the tag portion inductive antenna to the reader portion inductive antenna and causing the tag portion inductive antenna to pass the received identification signal to the reader portion inductive antenna via the switch;
receiving an identification signal by the to portion inductive antenna; and
transmitting the identification signal by the reader portion inductive antenna.

14. The method of claim 13, further comprising:
receiving an activation signal by the reader portion inductive antenna.

15. The method of claim 14, further comprising:
transmitting, in response to detecting the activation signal by the reader portion inductive antenna, the activation signal by the tag portion inductive antenna.

16. The method of claim 13, wherein the identification signal corresponds to a radio frequency identification (RFID) device.

17. The method of claim 13, wherein transmitting the identification signal by the reader portion of the antenna includes emulating operation of a remote RFID device from which the identification signal is received by the tag portion inductive antenna.

* * * * *